United States Patent
Park et al.

(10) Patent No.: US 10,642,329 B2
(45) Date of Patent: May 5, 2020

(54) PEAK CURRENT SUPPORT FOR A POWER RAIL SYSTEM VIA A SHARED SECONDARY POWER SUPPLY

(71) Applicant: QUALCOMM INCORPORATED, San Diego, CA (US)

(72) Inventors: Hee Jun Park, San Diego, CA (US); Taewoo Kwak, San Diego, CA (US); Christopher Kong Yee Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 15/077,949

(22) Filed: Mar. 23, 2016

(65) Prior Publication Data
US 2017/0277238 A1  Sep. 28, 2017

(51) Int. Cl.
*G06F 1/26* (2006.01)
*G06F 1/32* (2019.01)

(52) U.S. Cl.
CPC .............. *G06F 1/266* (2013.01); *G06F 1/263* (2013.01); *G06F 1/32* (2013.01)

(58) Field of Classification Search
CPC .............. G06F 1/266; G06F 1/32; G06F 1/26
USPC ......................................................... 713/310
See application file for complete search history.

(56) References Cited

U.S. PATENT DOCUMENTS

| | | | |
|---|---|---|---|
| 7,808,548 B1 | 10/2010 | Popescu-Stanseti et al. | |
| 8,271,806 B1 | 9/2012 | Xiao et al. | |
| 8,775,846 B2 * | 7/2014 | Robinson | G06F 1/263 323/318 |
| 8,977,874 B2 | 3/2015 | Rabii | |
| 2005/0008146 A1 * | 1/2005 | Chheda | G06F 1/263 379/413 |
| 2006/0262464 A1 * | 11/2006 | Bemat | H02J 1/102 361/18 |
| 2008/0024007 A1 * | 1/2008 | Budampati | H02J 1/08 307/19 |
| 2009/0315395 A1 | 12/2009 | Rogoll et al. | |

(Continued)

FOREIGN PATENT DOCUMENTS

| | | |
|---|---|---|
| WO | 2015196040 A1 | 12/2015 |
| WO | 2016036383 A1 | 3/2016 |

OTHER PUBLICATIONS

Product Publication / Technical Specification—ON Semiconductor—"NCP6914," Apr. 2014; pp. No. 01-36.

(Continued)

*Primary Examiner* — Phil K Nguyen
(74) *Attorney, Agent, or Firm* — Smith Tempel Blaha LLC/Qualcomm (57) ABSTRACT

Systems, methods, and computer programs are provided for controlling power in a computing device. One embodiment is a system comprising a plurality of power rails coupled to one or more computing device components. Each power rail has a primary power supply for producing current at a corresponding requested voltage. The system further comprises a shared secondary power supply selectively coupled to the plurality of power rails for providing a current increase. A controller selects one of the plurality of power rails to receive the current increase. The controller generates a control signal to electrically couple the shared secondary power supply to the selected power rail to receive the current increase.

20 Claims, 9 Drawing Sheets

(56) References Cited

U.S. PATENT DOCUMENTS

| | | | |
|---|---|---|---|
| 2010/0332857 A1* | 12/2010 | Vogman | G06F 1/263 |
| | | | 713/300 |
| 2015/0177798 A1 | 6/2015 | Venishetti et al. | |
| 2015/0180233 A1* | 6/2015 | Yamada | H02J 1/08 |
| | | | 307/23 |
| 2015/0229303 A1 | 8/2015 | Li | |
| 2016/0026227 A1* | 1/2016 | Kharbutli et al. | G06F 1/32 |
| | | | 713/300 |
| 2016/0156195 A1* | 6/2016 | Kouno | H02J 9/06 |
| | | | 307/31 |
| 2016/0179181 A1* | 6/2016 | Doyle | G06F 1/3287 |
| | | | 713/323 |
| 2016/0291660 A1* | 10/2016 | Chueh | G06F 1/263 |
| 2017/0177057 A1* | 6/2017 | Morning-Smith | G06F 1/3287 |

OTHER PUBLICATIONS

Product Publication / Technical Specification—"Powering Atmel MPUs with Active PMU PMICs," Atmel Corporation; Apr. 30, 2015; pp. No. 01-24.
International Search Report and Written Opinion—PCT/US2017/019504—ISA/EPO—dated May 18, 2017.

* cited by examiner

PEAK CURRENT SUPPORT FOR A POWER RAIL SYSTEM VIA A SHARED SECONDARY POWER SUPPLY

DESCRIPTION OF THE RELATED ART

Computing devices (e.g., servers, desktop computers, and portable computing devices, such as, cellular telephones, tablet computers, laptop computers, portable digital assistants, portable game consoles, wearable devices, and other battery-powered devices, etc.) are necessities for people on personal and professional levels. A computing device may have various electronic components that consume power, such as one or more cores of a system on-chip (SoC). Cores may include, for example, central processing units (CPUs), graphics processing units (GPUs), digital signal processors (DSPs), and memory systems.

The speed at which a computing device component operates may be increased or decreased in response to the clock frequency and the power supply voltage applied to it. Applying a higher-speed clock and, accordingly, a higher power supply voltage to a computing device component generally results in higher-speed operation but consumes more power. Because power conservation is particularly desirable in battery-operated computing devices, various schemes have been developed to balance computing device performance with power consumption. For example, a resource power manager (RPM) may monitor operating conditions in the computing device. When the RPM detects operating conditions that would undesirably impact performance, the RPM may generate an indication that power supplied to one or more components should be increased to maintain performance. A computing device may include one or more scalable-voltage or adjustable power supplies that the RPM may adjust to output a selected voltage.

A power rail may have one or more power supplies (e.g., switched-mode power supplies (SMPSs) or low-dropout regulators (LDOs)) to provide various levels of current at a requested voltage and manage peak current projections. Where a single power rail has a plurality of SMPSs, they may comprise a first phase or primary SMPS, a secondary or second phase SMPS, a tertiary or third phase SMPS, etc. A limit manager (LM) associated with the power rail may measure the peak current projections and limit the performance of computing device components when the current is higher than a fixed current threshold. Second and third phase SMPSs add additional complexity and cost to power supply designs even though they may be inactive under most operational conditions Accordingly, there remains a need for systems and methods for controlling power via power rail selection

SUMMARY OF THE DISCLOSURE

Systems, methods, and computer programs are disclosed for controlling power in a computing device. One embodiment is a system comprising a plurality of power rails coupled to one or more computing device components via one or more power multiplexers. Each power rail has a primary power supply for producing current at a corresponding requested voltage. The system further comprises a shared secondary power supply selectively coupled to the plurality of power rails for providing a current increase. A controller selects one of the plurality of power rails to receive a current increase. The controller generates a control signal to electrically couple the shared secondary SNIPS to the selected power rail to receive the current increase.

An exemplary method for controlling power in a computing device comprises selecting one of a plurality of power rails to receive a current increase. Each of the plurality of power rails has a corresponding primary power supply for producing current at a corresponding requested voltage. A control signal is generated to electrically couple a shared secondary power supply to the selected power rail to receive the current increase. The shared secondary power supply provides the current increase to the selected power rail.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "computing device" is used to describe any computing device, such as, for example, a server, a desktop computer, a laptop computer, and a portable computing device. A portable computing device may comprise any computing device operating on a limited-capacity power supply, such as a battery. Although battery-operated computing devices have been in use for decades, technological advances in rechargeable batteries coupled with the advent of third generation ("3G") and fourth generation ("4G") wireless technology have enabled numerous computing devices with multi-faceted capabilities.

Therefore, the term "portable computing device" may encompass a cellular telephone (e.g., a smartphone), a satellite telephone, a pager, a personal digital assistant (PDA), a navigation device, a smartbook or electronic reader, a media player, a laptop or hand-held computer with a wireless connection, a tablet computer, a portable game console, a special-purpose device (e.g., a cycling computer), or a wearable device (e.g., a fitness watch, etc.), among others.

The terms "central processing unit" ("CPU"), "digital signal processor" ("DSP"), and "graphics processing unit" ("GPU") are non-limiting examples of processors that may reside in a computing device. In the context of system-on-chip ("SOC") architectures, a processor may be a "core." These terms are used interchangeably in this specification except where otherwise indicated. The term "computing device component" is used in this specification to refer to a processor, core or other electronic component of a computing device that has power supply usage and control characteristics similar to those described below with regard to exemplary embodiments.

Figure 1:
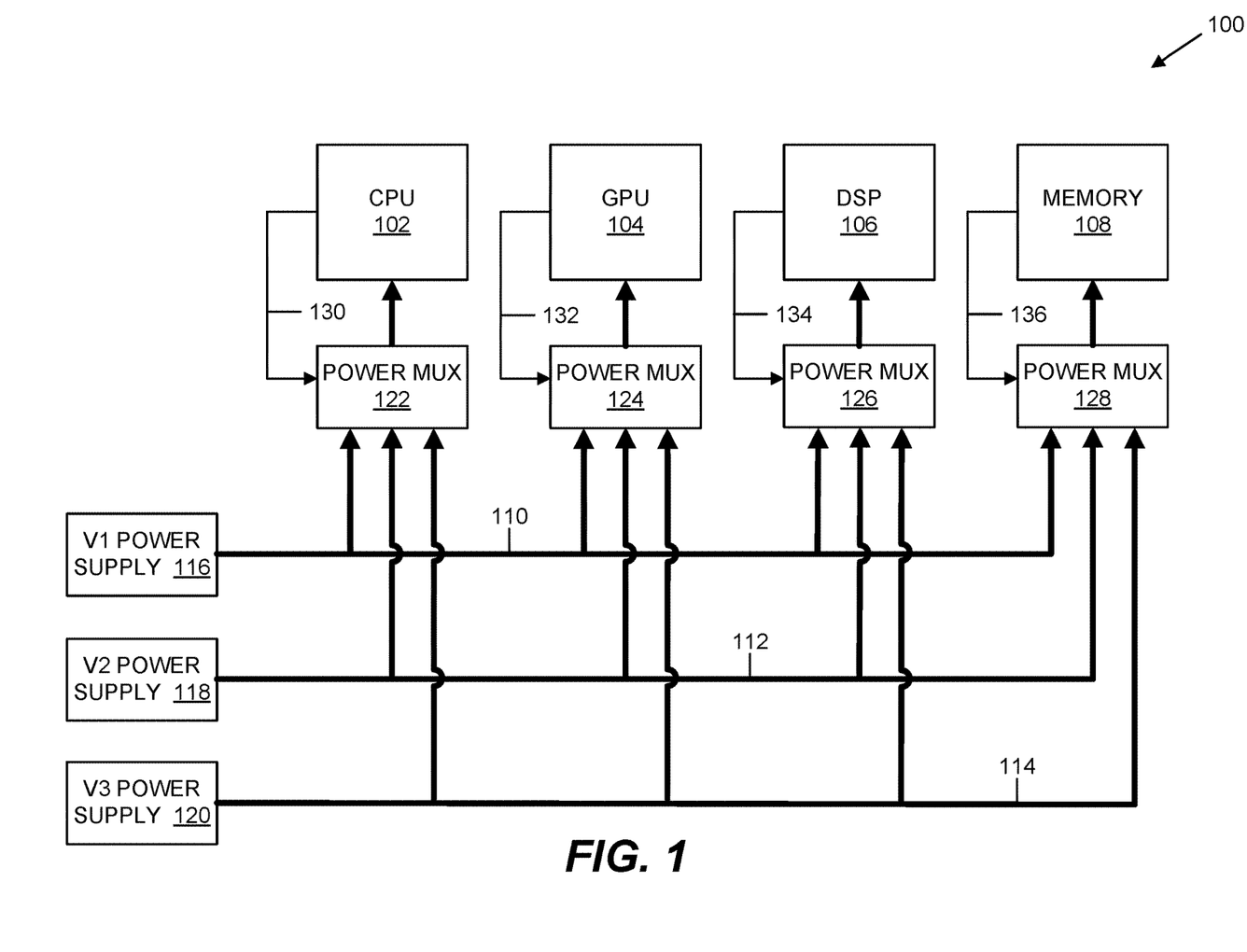
FIG. 1 is a block diagram illustrating an embodiment of a power supply design for incorporating current support for a power rail system via a shared secondary power supply.

FIG. 1 illustrates an exemplary system 100 for controlling power in a computing device. As illustrated in FIG. 1, the system 100 comprises a plurality of exemplary computing device components: a central processing unit (CPU) 102, a graphics processing unit (GPU) 104, a digital signal processor (DSP) 106, and a memory system 108. Although this exemplary embodiment includes four computing device components for illustrative purposes, other embodiments may include any other number of two or more computing device components. Each of these four exemplary computing device components may receive power from a selected one of three exemplary voltage rails 110, 112 and 114. As understood by one of ordinary skill in the art, the term "voltage rail" is used to encompass one or more power distribution elements, such as conductors, that route electrical current to power-consuming devices in a chip or other electronic system.

System 100 also includes a first power supply 116 that produces current at a first requested voltage ("V1") on voltage rail 110, a second power supply 118 that produces current at a second requested voltage ("V2") on voltage rail 112, and a third power supply 120 that produces current at a third requested voltage ("V3") on voltage rail 114. The term "requested voltage" means that the voltage is controlled so as to remain substantially constant across an operational range of battery voltage and loading. Although this exemplary embodiment includes three power supplies 116, 118, and 120, other embodiments may include any other number of such power supplies.

System 100 further includes power multiplexers 122, 124, 126 and 128. In this exemplary embodiment, power multiplexers 122, 124, 126, and 128 are 3:1 multiplexers, meaning that each has three power inputs and one power output. Nevertheless, in other embodiments such power multiplexers may have any other number of inputs. The power output of each of power multiplexers 122, 124, 126, and 128 is coupled to a power input of a corresponding computing device component. The power inputs of each of power multiplexers 122, 124, 126, and 128 are coupled to each of power supplies 116, 118, and 120 through voltage rails 110, 112, and 114. More specifically, a first power input of power multiplexer 122 is coupled to voltage rail 110, a second power input of power multiplexer 122 is coupled to voltage rail 112, and a third power input of power multiplexer 122 is coupled to voltage rail 114. Similarly, a first power input of power multiplexer 124 is coupled to voltage rail 110, a second power input of power multiplexer 124 is coupled to voltage rail 112, and a third power input of power multiplexer 124 is coupled to voltage rail 114. Also, a first power input of power multiplexer 126 is coupled to voltage rail 110, a second power input of power multiplexer 126 is coupled to voltage rail 112, and a third power input of power multiplexer 126 is coupled to voltage rail 114. Likewise, a first power input of power multiplexer 128 is coupled to voltage rail 110, a second power input of power multiplexer 128 is coupled to voltage rail 112, and a third power input of power multiplexer 128 is coupled to voltage rail 114.

Each computing device component may produce a power supply voltage request. The power supply voltage request may comprise a signal, message, or other indication that indicates a selected one of a number of selectable power levels. The selectable power levels correspond to the above-described voltages or voltage levels, such as V1, V2 and V3 in the embodiment illustrated in FIG. 1. Thus, in this embodiment a power supply voltage request also corresponds to one of the power supplies 116, 118, and 120.

Each computing device component may select or determine its own desired operating voltage or power level. In an embodiment, the selected or desired operating voltage or power level may be represented by the power supply voltage request. Furthermore, the computing device component may be programmed or otherwise configured with an algorithm or similar logic that provides the intelligence for selecting or determining its own desired operating voltage or power level.

Each of power multiplexers 122, 124, 126, and 128 may also include a control or selector input. In the embodiment illustrated in FIG. 1, the control input of each of power multiplexers 122, 124, 126, and 128 receives a corresponding control signal 130, 132, 134 and 136, respectively, in response to one of the power supply voltage requests. In the embodiment illustrated in FIG. 1, power multiplexers 122, 124, 126, and 128 receive control signals 130, 132, 134, and 136 directly from the corresponding computing device components, i.e., CPU 102, GPU 104, DSP 106, and memory system 108, respectively. In other words, in this embodiment each computing device component produces a control signal 130, 132, 134, and 136 in response to its power supply voltage request. Power supply voltage requests are not shown in FIG. 1, as they are represented by signals, messages or other indications internal to the computing device components.

In response to the control signals 130, 132, 134, and 136 received at their respective selector or control inputs, each of power multiplexers 122, 124, 126, and 128 selects one of voltage rails 110, 112, and 114. Accordingly, the current and voltage characteristics supplied by a selected one of voltage rails 110, 112, and are coupled through the selecting one of power multiplexers 122, 124, 126, and 128 to the power input of the corresponding computing device component. Each computing device component that is selectively coupled to one of voltage rails 110, 112, and 114 draws current through a selected one of voltage rails 110, 112, and 114 and, correspondingly, from a selected one of the power supplies 116, 118, and 120.

Figure 2:
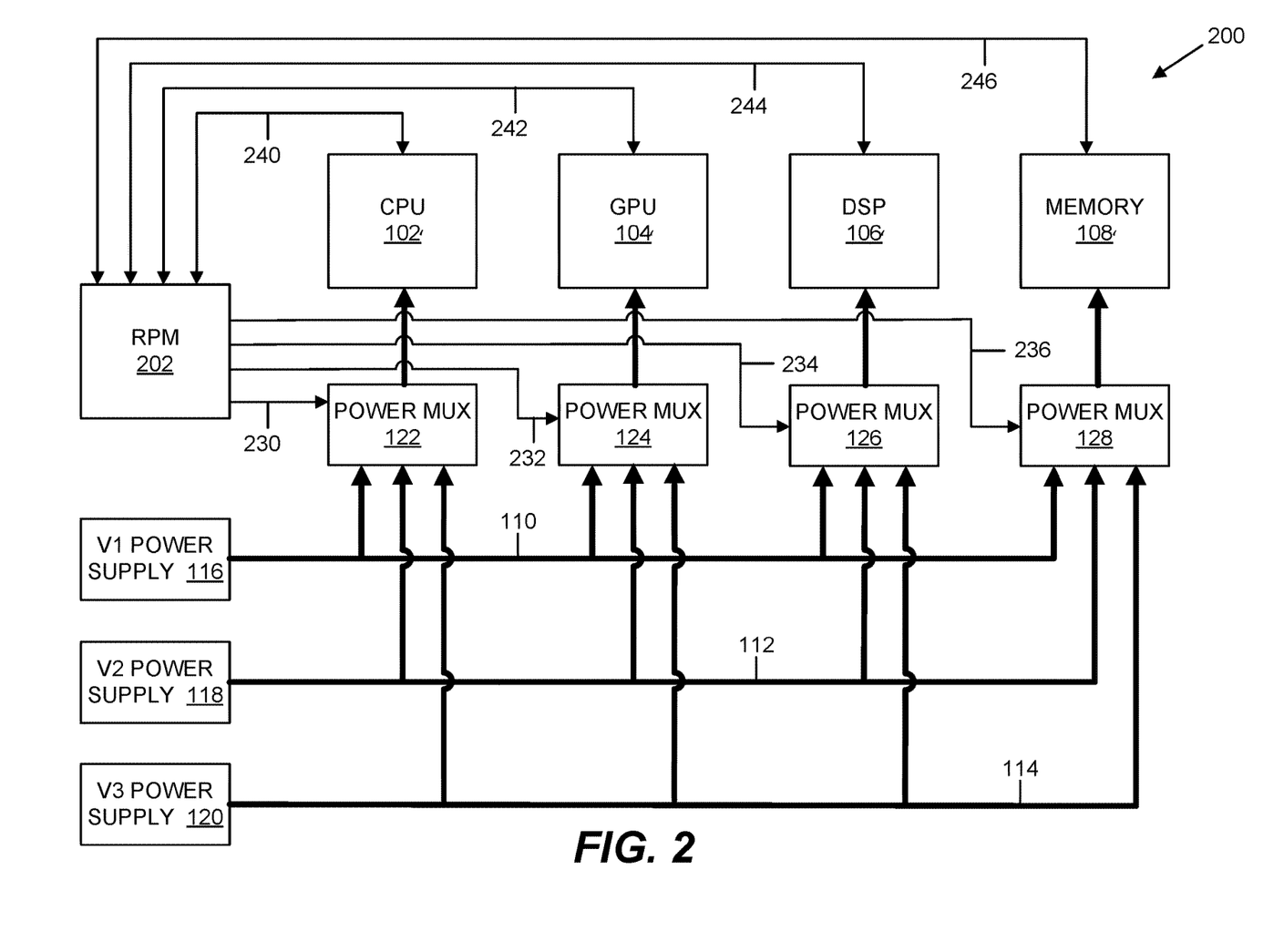
FIG. 2 is a block diagram illustrating another embodiment of a power supply design for incorporating current support for a power rail system via a shared secondary power supply.

FIG. 2 illustrates another exemplary system 200 for controlling power in a computing device. As illustrated in FIG. 2, in another illustrative or exemplary embodiment, the system 200 for providing power control in a computing device includes a group of exemplary computing device components: CPU 102, GPU 104, DSP 106, and memory system 108. System 200 also includes a first power supply 116 that produces current at a first requested voltage V1 on voltage rail 110, a second power supply 118 that produces current at a second requested voltage V2 on voltage rail 112, and a third power supply 120 that produces current at a third requested voltage V3 on voltage rail 114.

System 200 further includes power multiplexers 122, 124, 126 and 128. The power output of each of power multiplexers 122, 124, 126 and 128 is coupled to a power input of a corresponding computing device component. The power inputs of each of power multiplexers 122, 124, 126 and 128 are coupled to each of power supplies 116, 118, and 120 through voltage rails 110, 112, and 114 in the same manner as in the embodiment described above with regard to FIG. 1.

Each of power multiplexers 122, 124, 126 and 128 also has a control or selector input. In the embodiment illustrated in FIG. 2, the control input of each of power multiplexers 122, 124, 126 and 128 receives a corresponding control signal 230, 232, 234 and 236, respectively, from a resource power manager 202. Resource power manager 202 produces control signals 230, 232, 234, and 236 in response to power supply voltage requests, which are included in component signals 240, 242, 244 and 246, respectively. Component signals 240, 242, 244 and 246 include all signals, messages, or other information communicated between the computing device components and resource power manager 202. As in the embodiment described above with regard to FIG. 1, each component in this embodiment may produce a power supply voltage request indicating a selected power level and thus corresponding to one of power supplies 116, 118, and 120. In the embodiment illustrated in FIG. 2, power multiplexers 122, 124, 126, and 128 receive control signals 230, 232, 234, and 236 directly from resource power manager 202. In other words, in this embodiment resource power manager 202 produces control signals 230, 232, 234, and 236 in response to power supply voltage requests produced by the computing device components.

In response to receiving a power supply voltage request from a computing device component, resource power manager 202 may activate (i.e., turn on) the corresponding one of power supplies 116, 118, and 120 if it is not active at the time the power supply voltage request is received. In an instance in which resource power manager 202 activates one of power supplies 116, 118, and 120, resource power manager 202 may then communicate an acknowledgement indication or handshake to the requesting computing device component. If there are any one or more power levels (and corresponding power supplies 116, 118, and 120) for which resource power manager 202 does not receive a power supply voltage request from any of the computing device components, then resource power manager 202 may deactivate (i.e., turn off) any such non-requested ones of power supplies 116, 118, and 120.

In response to the control signals 230, 232, 234, and 236 received at their respective selector or control inputs, each of power multiplexers 122, 124, 126, and 128 selects one of voltage rails 110, 112, and 114. Accordingly, the current and voltage characteristics supplied by a selected one of voltage rails 110, 112, and 114 are coupled through the selecting one of power multiplexers 122, 124, 126 and 128 to the power input of the corresponding computing device component. Each computing device component that is selectively coupled to one of voltage rails 110, 112, and 114 in this manner thus draws current through a selected one of voltage rails 110, 112, and 114 and, correspondingly, from a selected one of power supplies 116, 118, and 120.

Figure 3:
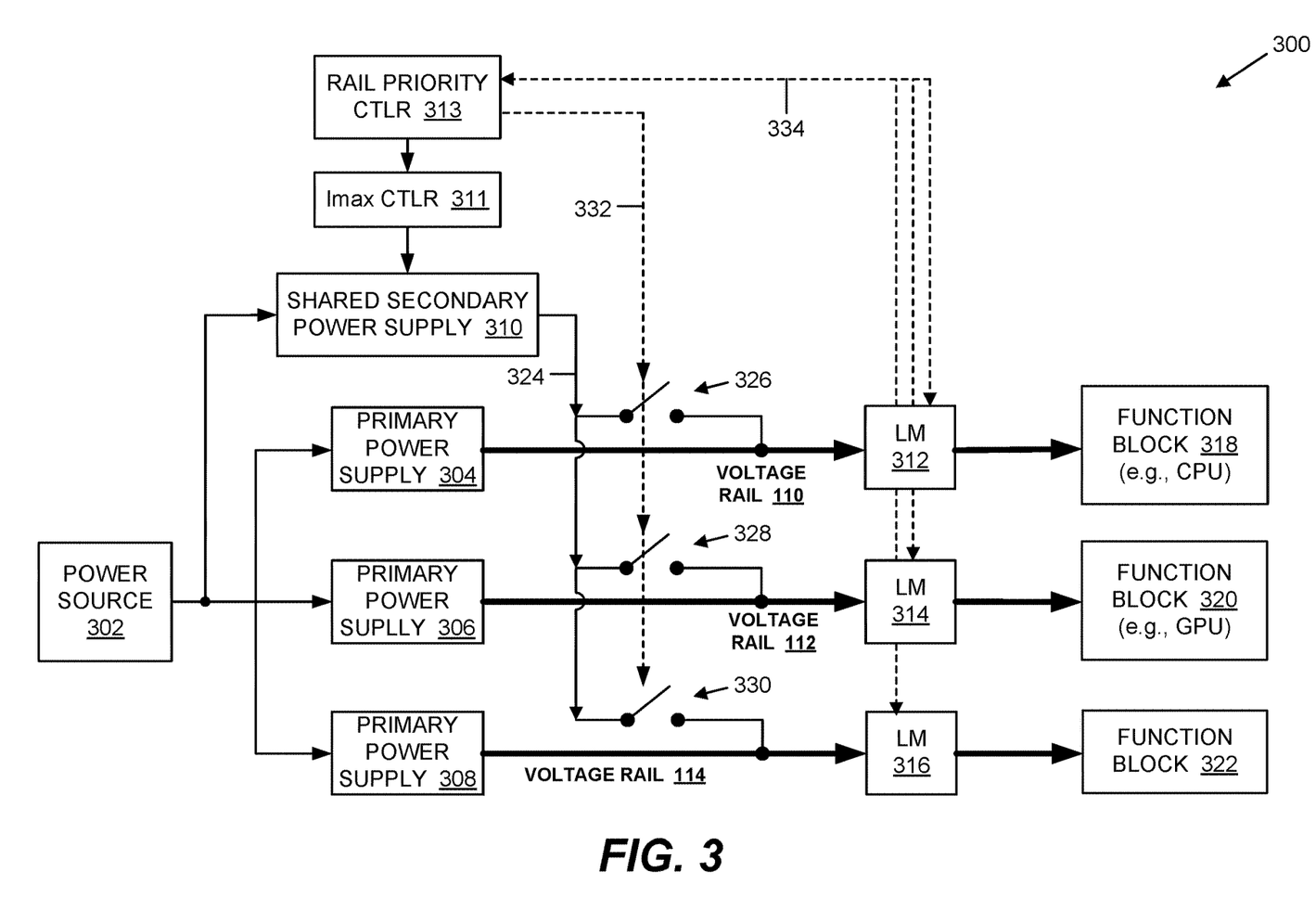
FIG. 3 is a block diagram illustrating an embodiment of a system comprising a shared secondary power supply for providing peak current support to a plurality of power rails.

FIG. 3 is a block diagram illustrating an embodiment of a system 300 that may incorporated in the systems 100 and 200 described above for providing peak current support to the power rails 110, 112, and 114. In the embodiment of FIG. 3, the power supplies 116, 118, and 120 comprise a single or primary power supply, such as, for example, primary power supplies 304, 306, and 308, respectively. As illustrated in FIG. 3, the primary power supplies 304, 306, and 308 are coupled to a power source 302. System 300 further comprises a secondary "helper" power supply 310 for providing peak current support to the power rails 110, 112, and 114. The secondary power supply 310 is selectively shared by the primary power supplies 304, 306, and 308 by controlling switches 326, 328, and 330.

One of ordinary skill in the art will readily appreciate that the primary and secondary power supplies may comprise any suitable power regulator. In an embodiment, one or more of the primary and secondary power supplies comprises a switched-mode power supply. In other embodiments, buck convertors or other types of power regulators may be used, including, for example, a low-dropout (LDO) regulator or other types. Furthermore, it should be appreciated that the shared secondary power supply 310 may comprise one or more regulators depending on the size of the "helper" requirement.

The shared secondary power supply 310 is dynamically reconfigurable depending on the load of the computing device components coupled to the voltage rails to power multiplexers (i.e., function blocks 318, 320, and 322). The shared secondary power supply 310 is electrically coupled to the power rails 110, 112, and 114 via electrical switches 326, 328, and 330, respectively. In an embodiment, electrical switches 326, 328, and 330 comprise an integrated power switch that receives control signal(s) 332 generated by a rail priority controller 313. The control signal(s) 332 may close and open the power switches to selectively provide additional current, via connection(s) 324, from the shared secondary power supply 310 to one of the power rails 110, 112, and 114.

The rail priority controller 313 may dynamically determine a rail priority for a peak current increase (i.e., Imax increase). In other words, the rail priority controller 313 determines which of the power rails 110, 112, and 114 is to be electrically coupled to the shared secondary power supply 310. The rail priority for the Imax increase may be determined based on counts and/or statistics for reaching a current limit threshold. In other embodiments, the rail priority may be determined based on one or more of the following: power estimation, power multiplexer connection status, leakage IDDQ, junction temperature(s), frequency, or power collapse status of any of the computing device components coupled to the function blocks 318, 320, and 322. In another implementation, the rail priority may comprise static information. As illustrated in FIG. 3, the rail priority controller 313 may receive rail priority information from limit manager (LM) blocks 312, 314, and 316 associated with power rails 110, 112, and 114, respectively, via connection(s) 334. Furthermore, the rail priority controller 313 may dynamically adjust a current limit threshold by sending control signals to LM blocks 312, 314, and 316 via connection(s) 334. A peak current (Imax) controller 311 may be coupled to the rail priority controller 313 and the shared secondary power supply 310 for providing the additional current to connection(s) 324.

It should be appreciated that the shared secondary power supply 310 may be a higher or lower performance than the primary power supplies 304, 306, and 308. The shared secondary power supply 310 may be switched in and connected to an appropriate power rail when needed on a power rail that has high peak current demand. If all of the power rails 110, 112, and 114 have current lower than the current capability of the primary power supplies 304, 306, and 308, the shared secondary power supply 310 may be left out of circuit (i.e., turned off) to optimize conversion efficiency and minimize power loss.

To further illustrate the operation of the system 300 in FIG. 3, consider an example in which the function block 318 coupled to the LM block 312 comprises a CPU, and the function block 320 coupled to the LM comprises a GPU. Each of the primary power supplies 304, 306, and 308 may be configured with a power supply capability of approximately 3 amps, and the secondary shared power supply 310 may be configured with a power supply capability of approximately 4 amps. Each of the LM blocks 312, 314, and 316 may be configured with an initial limit threshold of 3 amps. In a first operational scenario, the CPU (i.e., function block 318) may be running a relatively heavy workload while the GPU (i.e., function block 320) and the other function blocks (i.e., function block(s) 322) may be running a relatively light workload. The rail priority controller 313 may detect that the CPU has reached the current limit threshold of 3 amps, and that more power supply current to the power rail 110 is needed. In response, the rail priority controller 313 may be configured to connect the shared secondary power supply 310 to the power rail 110 by connecting the switch 326. When the shared secondary power supply 310 is connected to the power rail 110, the combined power supply capacity increases from 3 amps to 7 amps (i.e., 4 amps from the shared secondary power supply 310 and 3 amps from the primary power supply 304). Accordingly, the rail priority controller 313 may also adjust the limit threshold of the LM block 312 from approximately 3 amps to 7 amps to accommodate the CPU heavy workload.

Now consider a second operational example of system 300 (FIG. 3) in which the GPU (i.e., function block 320) may be running a relatively heavy workload while the CPU (i.e., function block 318) and the other function blocks (i.e., function block(s) 322) may be running a relatively light workload. The rail priority controller 313 may detect that the GPU has reached the current limit threshold of 3 amps, and that more power supply current to the power rail 112 is needed. In response, the rail priority controller 313 may be configured to connect the shared secondary power supply 310 to the power rail 112 by connecting the switch 328. When the shared secondary power supply 310 is connected to the power rail 112, the combined power supply capacity on power rail 112 may be increased from 3 amps to 7 amps (i.e., 4 amps from the shared secondary power supply 310 and 3 amps from the primary power supply 306). Accordingly, the rail priority controller 313 may also adjust the limit threshold of the LM block 314 from approximately 3 amps to 7 amps to accommodate the GPU heavy workload.

Figure 4:
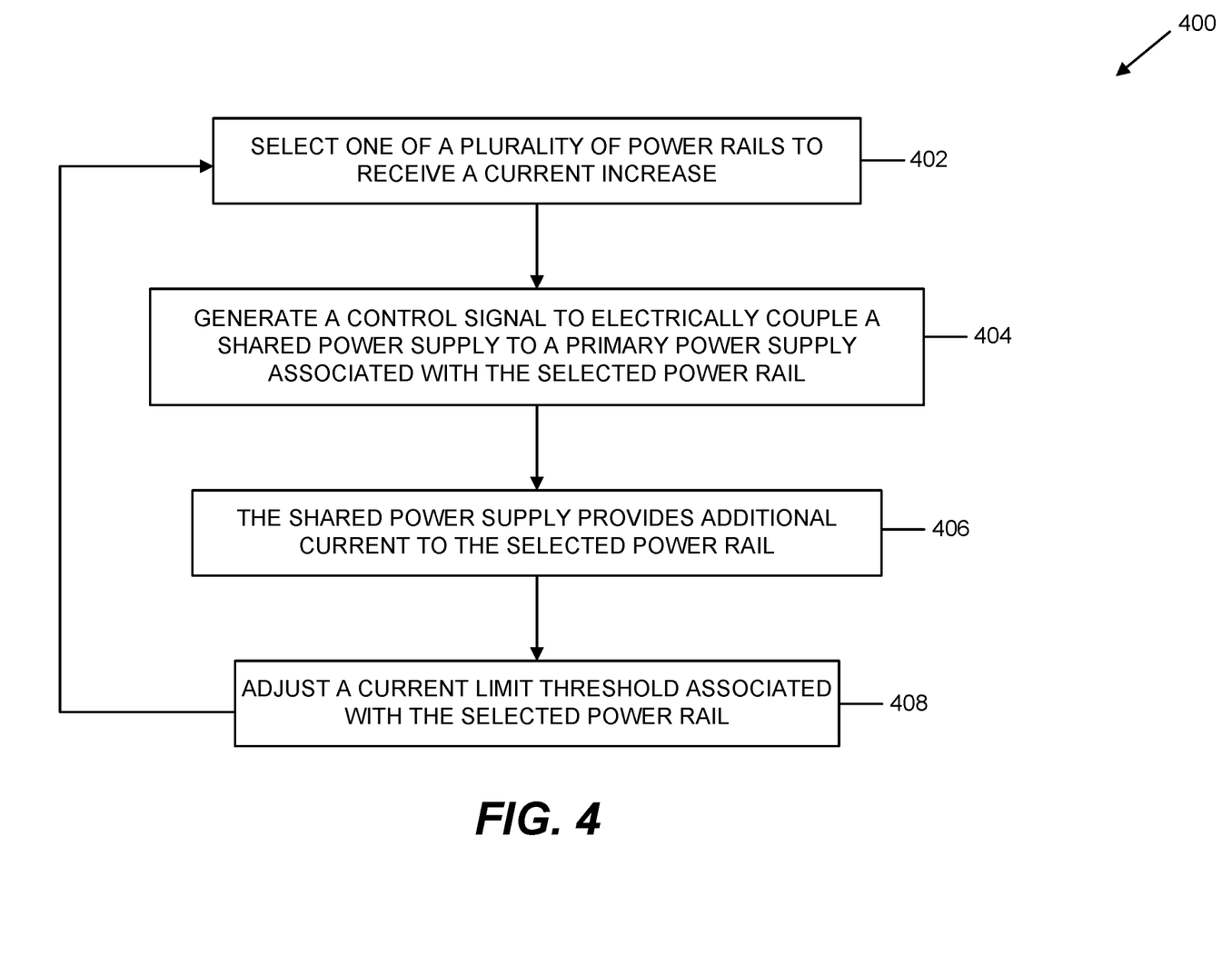
FIG. 4 is a flowchart illustrating an embodiment of a method implemented in the system of FIG. 3 for providing peak current support to a power rail system via a shared secondary power supply.

FIG. 4 is a flowchart illustrating an embodiment of a method implemented in the system of FIG. 3 for selectively providing peak current support to power rails 110, 112, and 114 via the shared secondary power supply 310. At block 402, one of the power rails 110, 112, and 114 is selected for peak current support. The selected power rail may be determined may be determined based variable data provided by the LM blocks 312, 314, and 316, fixed data, or one or more of the following: power estimation, power multiplexer connection status, leakage IDDQ, junction temperature(s), frequency, or power collapse status of any of the computing device components coupled to the function blocks 318, 320, and 322. At block 404, the rail priority controller 313 generates a control signal 332 to electrically couple the shared secondary power supply 310 to the primary power supply 304, 306, or 308 associated with the selected power rail by closing one of switches 326, 328, and 330. At block 406, the shared secondary power supply 310 provides additional peak current to the selected power rail. At block 408, the rail priority controller 313 may adjust a current limit threshold associated with the selected power rail.

The limit threshold in the LM blocks 318, 320, and 322 may be determined based on a maximum power supply capability. In an embodiment, by measuring the current on the voltage rail, the LM block may detect a current load that is higher than the limit threshold. In response, the LM block may adjust the performance of one or more cores (e.g., CPU, GPU, DSP) and the memory 108 to keep the current loading under the power supply capability. In this manner, it should be appreciated that the system 300 may reconfigure the shared secondary power supply 310 and connect it to one of a plurality of the voltage rails 110, 112, and 114. Furthermore, the limit threshold of the LM block may also be dynamically adjusted according to the power supply configurations. For example, the limit threshold of a given power rail may be higher when the secondary shared power supply 310 is connected to the power rail, but the limit threshold of a power rail may be lower when the shared secondary power supply 310 is connected to one of the other power rails. The peak allowed current threshold (i.e., limit threshold) of each LM block may be dynamically adjusted according to the configuration (e.g., coupling) of the shared secondary power supply 310. In an embodiment, the peak current can be controlled by limiting the maximum allowed performance level of a LM block.

Figure 5:
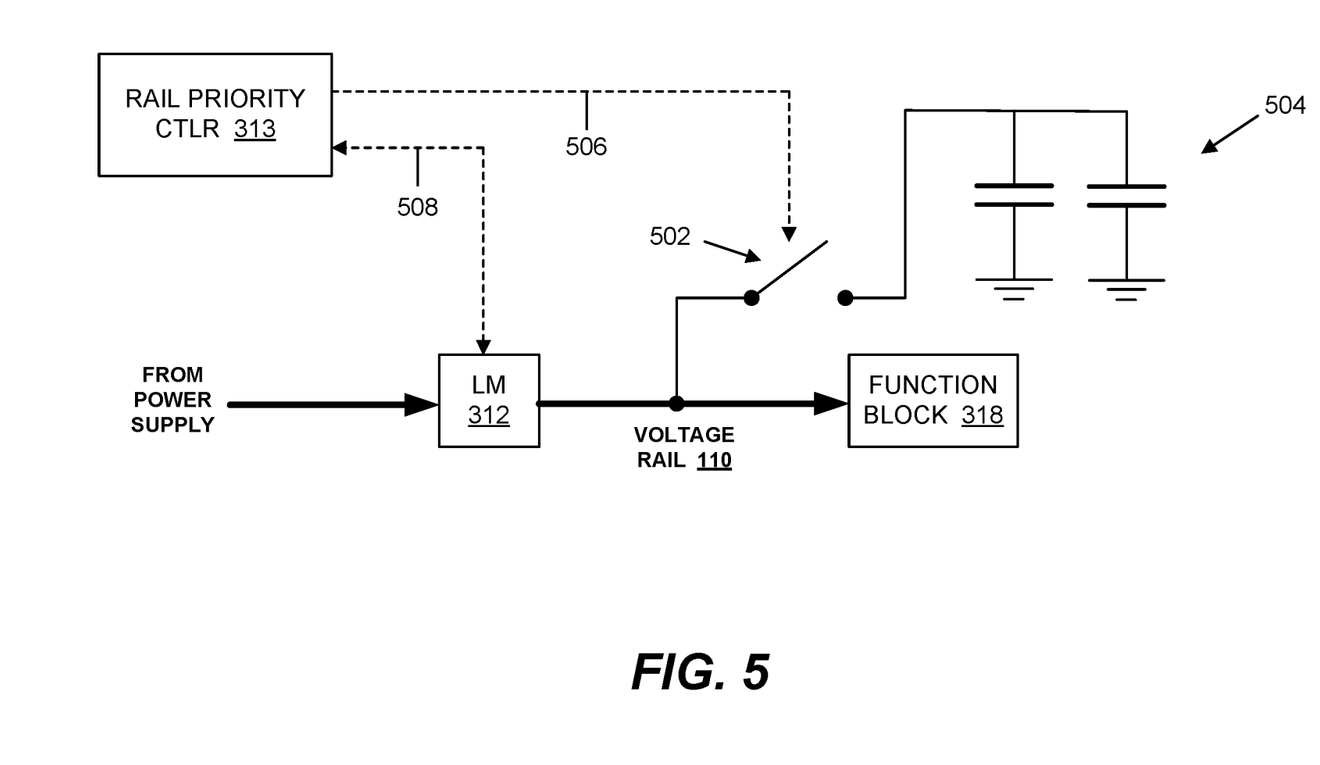
FIG. 5 is block diagram illustrating a switchable decoupling capacitor connected to one of the power rails in FIG. 3.

Referring to FIG. 5, it should be appreciated that each of the voltage rails 110, 112, and 114 may be selectively switched to a decoupling capacitor 504 via an electrical switch 502. The switch 502 may be controlled via control signals 506 provided by the rail priority controller 313. FIG. 5 illustrates a single power rail 110, although it should be appreciated that power rails 112 and 114 may be similarly switched to a decoupling capacitor 504. As illustrated in the example of FIG. 5, when the decoupling capacitor 504 is connected to the power rail 110 via the switch 502, the decoupling capacitor 504 can provide power for a short peak current so that peak current on the LM block 312 and the power supply may be reduced. Typically, a power rail with heavy current loading tends to have larger peak current. Therefore, the rail priority controller 313 is configured to connect the decoupling capacitor 504 to the power rail with heavy current loading in order to mitigate the peak current from the core side and reduce the peak current seen on the side of the power supply and the LM block 312.

Figure 6:
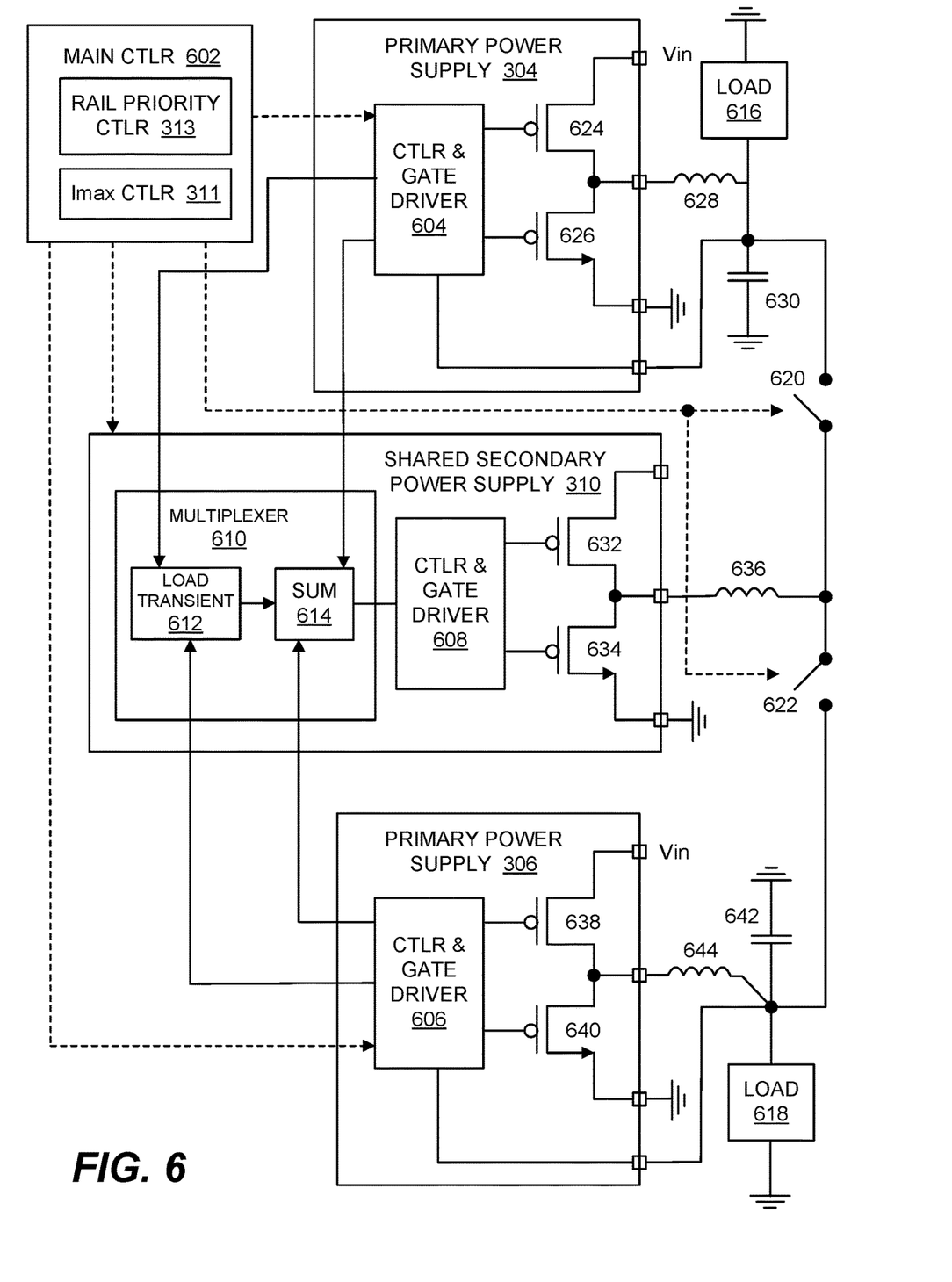
FIG. 6 illustrates an embodiment of a circuit design for implementing the shared secondary power supply in FIG. 3.

One of ordinary skill in the art will readily appreciate that the primary power supplies 304, 306, and 308 and the secondary shared "helper" regulator (i.e., shared secondary power supply 310) may be configured in various ways. FIG. 6 illustrates one embodiment in which two primary power supplies 304 and 306 configure a voltage regulation loop as a voltage source and the shared secondary power supply 310 is configured as a dependent current source. It should be appreciated that any number of additional primary power supplies may be incorporated. In this embodiment, the primary power supplies 304 and 306 regulates the output voltage, and the shared secondary power supply 310 provides necessary current to the output as a current-controlled current source using inductor current information of the primary power supplies 304 and 306.

As illustrated in FIG. 6, the primary power supplies 304 and 306 comprise controller and gate drivers 604 and 606, respectively. The shared secondary power supply 310 comprises a controller and gate driver 608 and a multiplexer 610. In an embodiment, the multiplexer 610 comprises a load transient data component 612 coupled to a sum component 614. The load transient data component 612 is coupled to the controller and gate drivers 604 and 606 for receiving inductor current information from the primary power supplies 304 and 306, respectively.

The primary power supply 304 is coupled to a load 616 via an inductor 628. The controller and gate driver 604 is coupled to the load transient data component 612 and the sum component 614. As further illustrated in FIG. 6, the primary power supply 304 further comprises a pair of transistors 624 and 626 coupled to the controller and gate driver 604. The transistor 624 has a first terminal coupled to the controller and gate driver 604, a second terminal coupled to a voltage input (Vin), and a third terminal coupled to the inductor 628. The transistor 626 has a first terminal coupled to the controller and gate driver 604, a second terminal coupled to the inductor 628, and a third terminal coupled to a ground. The controller and gate driver 604 is also coupled to the load side of the inductor 628, which includes a capacitor 630.

Similarly, the primary power supply 306 may be coupled to another load 618 via an inductor 644. The controller and gate driver 606 is coupled to the load transient data component 612 and the sum component 614. The primary power supply 306 further comprises a pair of transistors 638 and 640 coupled to the controller and gate driver 606. The transistor 638 has a first terminal coupled to the controller and gate driver 606, a second terminal coupled to a voltage input (Vin), and a third terminal coupled to the inductor 644. The transistor 640 has a first terminal coupled to the controller and gate driver 606, a second terminal coupled to the inductor 644, and a third terminal coupled to a ground. The controller and gate driver 606 is also coupled to the load side of the inductor 644, which includes a capacitor 642.

The shared secondary power supply 310 is coupled to switches 620 and 622 via an inductor 636. The controller and gate driver 608 is coupled to the multiplexer 610. The shared secondary power supply 610 further comprises a pair of transistors 632 and 634. The transistor 632 has a first terminal coupled to the controller and gate driver 608, a second terminal coupled to a voltage input (Vin), and a third terminal coupled to the inductor 636. The transistor 634 has a first terminal coupled to the controller and gate driver 608, a second terminal coupled to the inductor 636, and a third terminal coupled to a ground.

As further illustrated in FIG. 6, a main controller 602 comprising the rail priority controller 313 and the Imax controller 311 is coupled to the power supplies 304, 306, and 310. The main controller 602 selectively connects and disconnects the shared secondary power supply 310 to the loads 616 and 618 via switches 620 and 622, respectively.

One of ordinary skill in the art will readily appreciate that adding load transient information to the shared secondary power supply 310 may improve dynamic response capability because, for example, the feed forward information is faster than the inductor current information. Furthermore, the controller and gate drivers 604, 606, and 608 residing in the power supplies 304, 306, and 310, respectively, may be implemented by any existing or new modulation scheme, such as, for example, Pulse Width Modulation (PWM) and Pulse Frequency Modulation (PFM). As known in the art, PWM is a modulation scheme to change the duty cycle of switch control signals using a constant frequency. PFM is a modulation scheme to change the switching frequency of switch control signals. It represents various frequency modulation schemes such as constant on-time control, constant off-time control, or hysteresis control. In an embodiment, the primary power supplies 304 and 306 may have a wider bandwidth than the shared secondary power supply 310 so that the primary power supplies 304 and 306 can correctly regulate the output voltage by absorbing any disturbance from the secondary power supply 310 while the secondary power supply 310 is providing required current to the output as a dependent current source.

Figure 7:
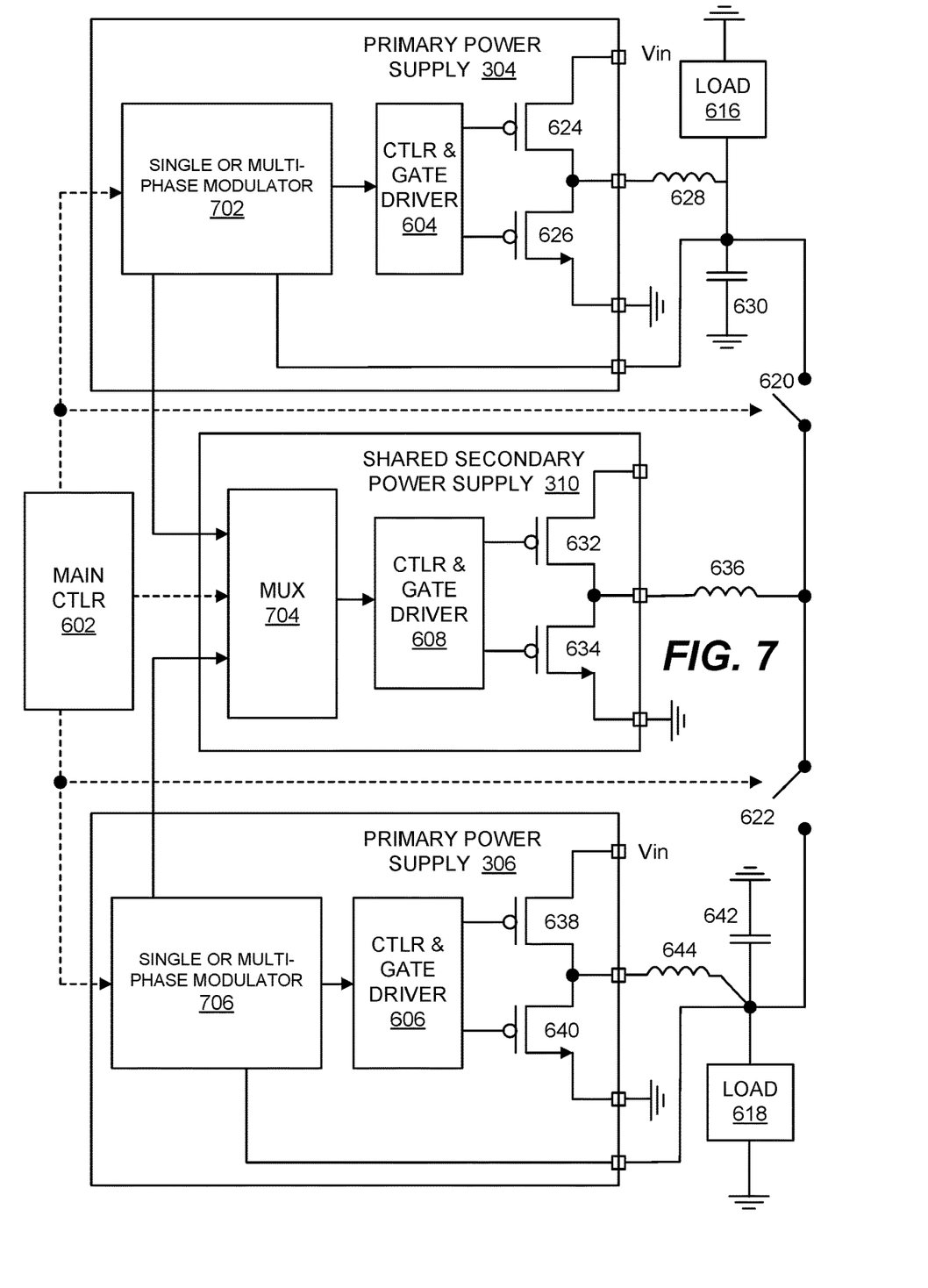
FIG. 7 illustrates another embodiment of a circuit design for implementing the shared secondary power supply in FIG. 3.

FIG. 7 illustrates another embodiment for implementing the primary power supplies 304 and 306 and the secondary shared power supply 310. The embodiment of FIG. 7 comprises a variation of the embodiment of FIG. 6. In this embodiment, the primary power supplies 304 and 306 are configured using switch control signals with a single-phase or multi-phase modulators 702 and 706, respectively. It should be appreciated that the single-phase or multi-phase modulation core may be placed in the primary or the shared secondary power supplies.

Figure 8:
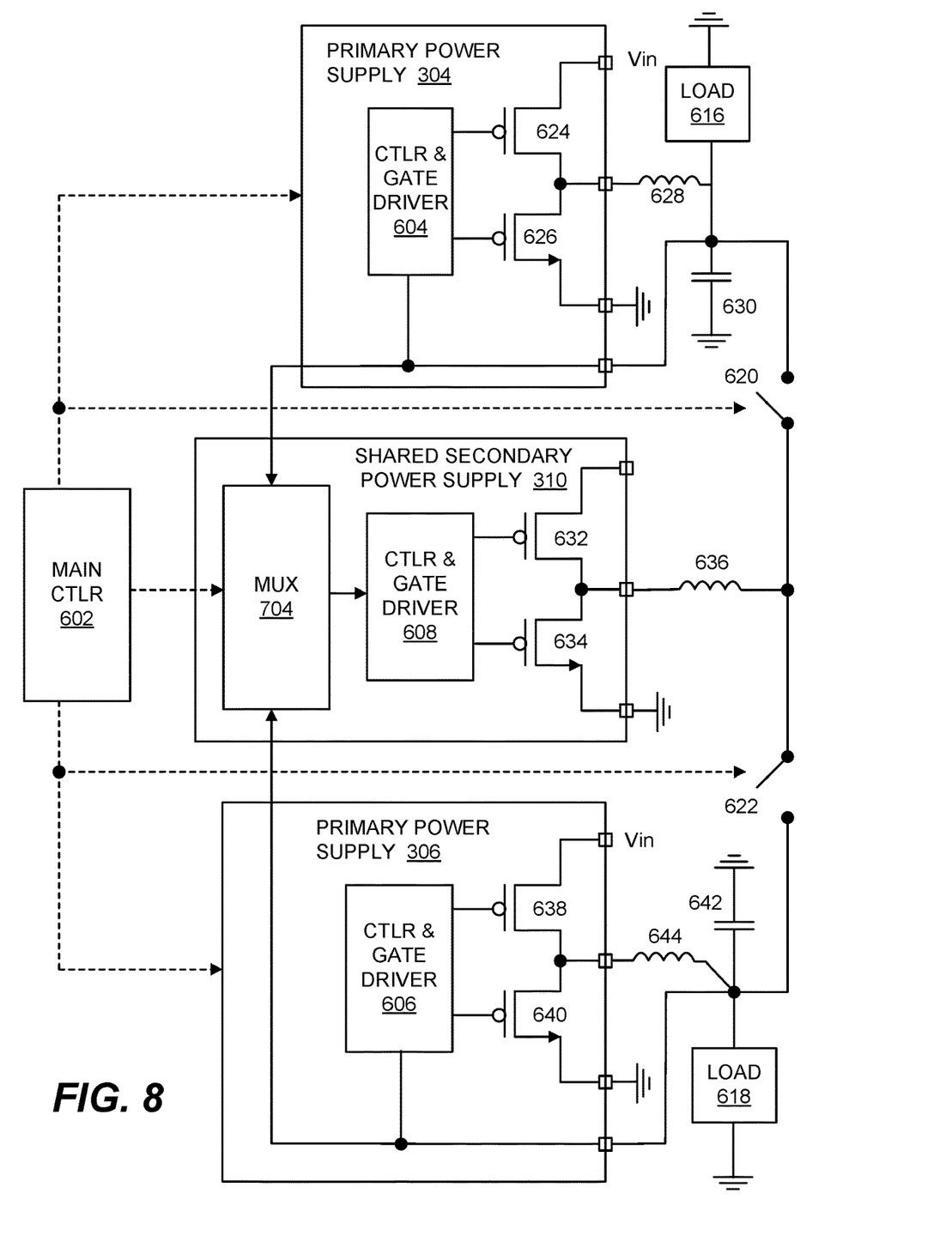
FIG. 8 illustrates a further embodiment of a circuit design for implementing the shared secondary power supply in FIG. 3.

FIG. 8 illustrates a further embodiment of a circuit design for implementing the configuration of the primary and the shared secondary power supplies. One of ordinary skill in the art will readily appreciate that the variation of FIG. 8 comprises two voltage regulation loops that are connected in parallel. Both the primary power supplies 304 and 306 and the shared secondary power supply 310 have voltage feedback from the output. It should be further appreciated that the alternative embodiment of FIG. 8 is similar to parallel power supplies except that the shared secondary power supply 310 does not have a separate output capacitor.

In the exemplary embodiments, the above-described methods for power control may be effected through logic with which the computing device and portions thereof, such as a resource power manager and computing device components, are configured. Such logic may be represented by the methods and systems described above and illustrated in the drawings. It should be appreciated that the logic may be embodied in any form, including forms commonly referred to as software, firmware, programmable logic, etc. As used in this specification, the term "software" encompasses processor-executable code or instructions. Although not separately shown for purposes of clarity, a resource power manager may include a processor controlled in part by such logic. The logic may be stored in a memory in the resource power manager, computing device component(s), or other portion(s) of the computing device. It should be noted that a combination of a non-transitory computer-readable storage medium and the computer-executable code or instructions stored therein for execution by a processor defines a "computer program product" as that term is understood in the patent lexicon. Furthermore, a computing device, a resource power manager, or one or more computing device components, as programmed or configured with such logic or instructions, may serve as a "means" for performing one or more of the method steps or device functions described herein.

Although certain acts or steps in the methods described below naturally precede others for the exemplary embodiments to operate as described, the invention is not limited to the order of those acts or steps if such order or sequence does not alter the functionality of the invention. That is, it is recognized that some acts or steps may be performed before, after, or in parallel (i.e., substantially simultaneously) with other acts or steps without departing from the scope and spirit of the invention. In some instances, certain acts or steps may be omitted or not performed, without departing from the scope and spirit of the invention. Further, words such as "thereafter," "then," "next," etc., are not intended to limit the order of the acts or steps. Rather, such words are used to aid in guiding the reader through the descriptions of the exemplary methods.

Figure 9:
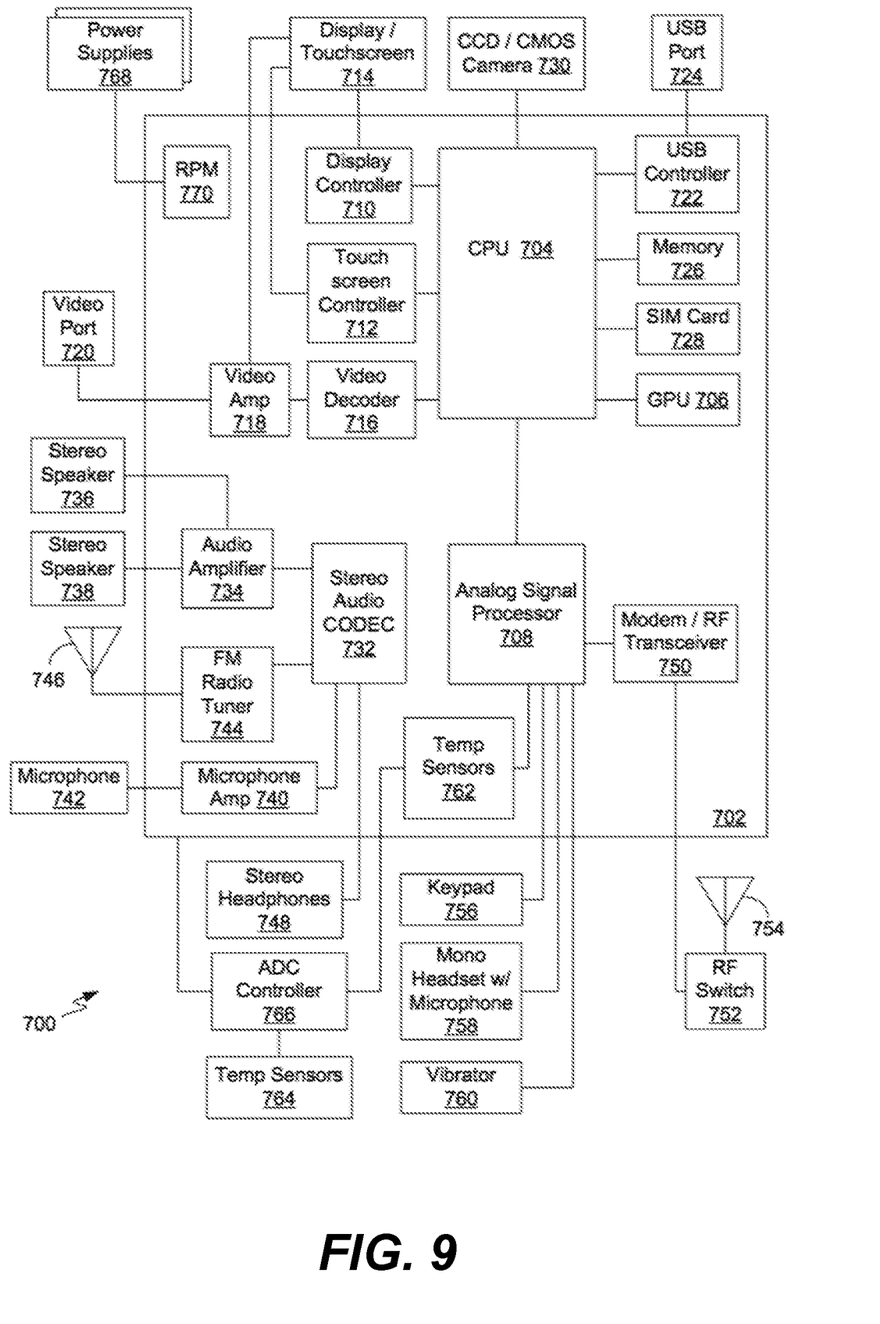
FIG. 9 is a block diagram of an exemplary computing device comprising a portable computing device for incorporating the systems and methods of FIGS. 3-8.

As illustrated in FIG. 9, in an illustrative or exemplary embodiment, the computing device comprises a portable computing device (PCD) 700. Computing device 700 includes an on-chip system 702, i.e., a system embodied in an integrated circuit chip.

In PCD 700, the processors of on-chip system 702 include a central processing unit ("CPU") 704 and a graphics processing unit ("GPU") 706. PCD 700 also includes an analog signal processor 708. Note that CPU 704 and GPU 706 may serve as any of the CPUs and GPUs, respectively, as described above.

A display controller 710 and a touchscreen controller 712 are coupled to CPU 704. A touchscreen display 714 external to on-chip system 702 is coupled to display controller 710 and touchscreen controller 712. PCD 700 may further include a video decoder 716. Video decoder 716 is coupled to CPU 704. A video amplifier 718 is coupled to video decoder 716 and touchscreen display 714. A video port 720 is coupled to video amplifier 718. A universal serial bus ("USB") controller 722 is also coupled to CPU 704, and a USB port 724 is coupled to USB controller 722. A memory 726, which may serve as any of the memory systems described above with regard to FIGS. 1-5, is coupled to CPU 704. A subscriber identity module ("SIM") card 728 may also be coupled to CPU 704. In addition, a digital camera 730 may be coupled to CPU 704.

A stereo audio CODEC 732 may be coupled to analog signal processor 708. Further, an audio amplifier 734 may be coupled to stereo audio CODEC 732. First and second stereo speakers 736 and 738, respectively, may be coupled to audio amplifier 734. In addition, a microphone amplifier 740 may be also coupled to stereo audio CODEC 732, and a microphone 742 may be coupled to microphone amplifier 740. A frequency modulation ("FM") radio tuner 744 may be coupled to stereo audio CODEC 732. An FM antenna 746 is coupled to the FM radio tuner 744. Further, stereo headphones 748 may be coupled to stereo audio CODEC 732.

A modem or radio frequency ("RF") transceiver 750 may be coupled to analog signal processor 708. An RF switch 752 may be coupled to RF transceiver 750 and an antenna 754. In addition, a keypad 756, a mono headset with a microphone 758, and a vibrator device 760 may be coupled to analog signal processor 708. Internal and external temperature sensors 762 and 764, respectively, maybe coupled to an analog-to-digital conversion ("ADC") controller 766.

Two or more power supplies 768, which may serve as any of the power supplies described above are coupled to on-chip system 702. A resource power manager 770 of the type described above may be included in on-chip system 702. In addition to being configured in the manner described above, resource power manager 770 may be configured to perform conventional resource power manager functions, as understood by one of ordinary skill in the art. Other power control and distribution elements, such as the above-described power multiplexers and voltage rails, are not shown in FIG. 9 for purposes of clarity.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for controlling power in a computing device, the method comprising:
    detecting with a current limit manager whether a current demand on one of a plurality of power rails coupled to an output of a corresponding one of a plurality of primary power supplies has reached a current limit threshold associated with the power rail, the output of each primary power supply being electrically isolated from the outputs of all other primary power supplies and being electrically coupled to exactly one of the power rails, each power rail being coupled to a current limit manager;
    in response to detection of the current demand on the power rail reaching the associated current limit threshold, selecting the power rail with a power rail priority controller from among the plurality of power rails to receive a current increase from a shared secondary power supply, the shared secondary power supply having a current output capability, the shared secondary power supply having an output coupled to a plurality of switches, each switch uniquely associated with one of the power rails and each switch being coupled to the power rail priority controller;
    the power rail priority controller electrically coupling the output of the shared secondary power supply to the selected power rail via the switch uniquely associated with the selected power rail while the output of the corresponding primary power supply remains coupled to the selected power rail; and
    the power rail priority controller increasing the current limit threshold associated with the selected power rail by an amount equal to the current output capability of the shared secondary power supply;
    wherein the power rail priority controller selecting the one of the plurality of power rails to receive the current increase comprises: determining a power rail priority in response to detection of a plurality of current demands on a corresponding plurality of the power rails.

2. The method of claim 1, wherein the power rail priority is determined based on data from one or more limit managers associated with the plurality of power rails.

3. The method of claim 1, wherein the selected power rail is determined based on one or more counts for reaching a current limit threshold.

4. The method of claim 1, wherein the selected power rail is determined based on one or more of a power estimation, a power multiplexer status, a leakage current, and a temperature or frequency of a component requesting the current increase.

5. The method of claim 1, wherein the computing device comprises a battery-powered portable computing device.

6. A system for controlling power in a computing device, the system comprising:
    means for detecting whether a current demand on one of a plurality of power rails coupled to an output of a corresponding one of a plurality of primary power supplies has reached a current limit threshold associated with the power rail, the output of each primary power supply being electrically isolated from the outputs of all other primary power supplies and being electrically coupled to exactly one of the power rails, the means for detecting comprising a plurality of current limit managers, each power rail being coupled to a current limit manager; and a power rail priority controller comprising:
  means for, in response to detection of the current demand on the power rail reaching the associated current limit threshold, selecting the power rail from among the plurality of power rails to receive a current increase from a shared secondary power supply, the shared secondary power supply having a current output capability, the shared secondary power supply having an output coupled to a plurality of switches, each switch uniquely associated with one of the power rails and each switch being coupled to the power rail priority controller;
  means for electrically coupling the output of the shared secondary power supply to the selected power rail via the switch uniquely associated with the selected power rail while the output of the corresponding primary power supply remains coupled to the selected power rail;
and means for increasing the current limit threshold associated with the selected power rail by an amount equal to the current output capability of the shared secondary power supply;
  wherein the means for selecting the one of the plurality of power rails to receive the current increase comprises: means for determining a power rail priority in response to detection of a plurality of current demands on a corresponding plurality of the power rails.

7. The system of claim 6, wherein the selected power rail is determined based on one or more counts for reaching a current limit threshold.

8. The system of claim 6, wherein the selected power rail is determined based on one or more of a power estimation, a power multiplexer status, a leakage current, and a temperature or frequency of a component requesting the current increase.

9. The system of claim 6, further comprising:
  means for multiplexing power inputs from the plurality of power rails to one or more components of the computing device.

10. The system of claim 6, wherein the portable computing device comprises one of a mobile telephone, a personal digital assistant, a pager, a smartphone, a navigation device, and a hand-held computer with a wireless connection.

11. A computer program product for power control in a computing device, the computer program product comprising processor-executable logic embodied in at least one non-transitory storage medium, execution of the logic by one or more processors configuring the computing device to:
  detect with a current limit manager whether a current demand on one of a plurality of power rails coupled to an output of a corresponding one of a plurality of primary power supplies has reached a current limit threshold associated with the power rail, the output of each primary power supply being electrically isolated from the outputs of all other primary power supplies and being electrically coupled to exactly one of the power rails, each power rail being coupled to a current limit manager;
  in response to detection of the current demand on the power rail reaching the corresponding current limit threshold, select the power rail with a power rail priority controller from among the plurality of power rails to receive a current increase from a shared secondary power supply, the shared secondary power supply having a current output capability, the shared secondary power supply having an output coupled to a plurality of switches, each switch uniquely associated with one of the power rails and each switch being coupled to the power rail priority controller:
  the power rail priority controller electrically couple the output of the shared secondary power supply to the selected power rail via a switch uniquely associated with the selected power rail while the output of the corresponding primary power supply remains coupled to the selected power rail; and
  the power rail priority controller increase the current limit threshold associated with the selected power rail by an amount equal to the current output capability of the shared secondary power supply;
  wherein the power rail priority controller selecting the one of the plurality of power rails to receive the current increase comprises: determining a power rail priority in response to detection of a plurality of current demands on a corresponding plurality of the power rails.

12. The computer program product of claim 11, wherein the power rail priority is determined based on data from one or more limit managers associated with the plurality of power rails.

13. The computer program product of claim 11, wherein the selected power rail is determined based on one or more counts for reaching a current limit threshold.

14. The computer program product of claim 11, wherein the selected power rail is determined based on one or more of a power estimation, a power multiplexer status, a leakage current, and a temperature or frequency of a component requesting the current increase.

15. The computer program product of claim 11, wherein the computing device comprises a battery-powered portable computing device.

16. A system for controlling power in a computing device, the system comprising:
  a plurality of primary power supplies, the output of each primary power supply being electrically isolated from the outputs of all other primary power supplies and being electrically coupled to exactly one of a plurality of power rails;
  a plurality of current limit managers, each configured to detect whether a current demand on one of the power rails has reached a current limit threshold associated with the one of the power rails;
  a shared secondary power supply selectively coupled to the plurality of power rails via a plurality of switches respectively and uniquely associated with the plurality of power rails, the shared secondary power supply having a current output capability; and
  a power rail priority controller coupled to each current limit manager by a signal line, the power rail priority controller configured to:
  select one of the plurality of power rails from among the plurality of power rails to receive a current increase in response to detection by one of the current limit managers of the current demand on the power rail reaching the associated current limit threshold;
electrically couple the output of the shared secondary power supply to only the selected power rail via activation of a particular switch uniquely associated with the selected power rail while the output of the corresponding primary power supply remains coupled to the selected power rail; and increase the current limit threshold associated with the selected power rail by an amount equal to the current output capability of the shared power supply;
  wherein the power rail priority controller is further configured to select the one of the plurality of power rails by determining a power rail priority in response to detection of a plurality of current demands on a corresponding plurality of the power rails.

17. The system of claim 16, wherein one or more of the primary power supplies and the shared power supply comprises one of a switched-mode power supply and a low-dropout regulator (LDO), and the shared power supply comprises a dependent current source.

18. The system of claim 16, wherein the power rail priority is determined based on data from one or more limit managers associated with the plurality of power rails.

19. The system of claim 16, wherein the selected power rail is determined based on one or more counts for reaching a current limit threshold.

20. The system of claim 16, wherein the computing device comprises a battery-powered portable computing device.

* * * * *